(12) United States Patent
Wang et al.

(10) Patent No.: US 8,121,042 B2
(45) Date of Patent: Feb. 21, 2012

(54) RELIABILITY ESTIMATION METHODS FOR LARGE NETWORKED SYSTEMS

(75) Inventors: Dazhi Wang, San Jose, CA (US);
Kishor S. Trivedi, Durham, NC (US);
Tilak C. Sharma, Tacoma, WA (US);
Anapathur V. Ramesh, Bothell, WA (US); David William Twigg, Federal Way, WA (US); Le P. Nguyen, Renton, WA (US); Yun Liu, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 12/493,665

(22) Filed: Jun. 29, 2009

(65) Prior Publication Data
US 2009/0323539 A1 Dec. 31, 2009

Related U.S. Application Data

(60) Provisional application No. 61/077,047, filed on Jun. 30, 2008.

(51) Int. Cl.
*H04J 1/16* (2006.01)
(52) U.S. Cl. ........................................ 370/248; 370/252
(58) Field of Classification Search .......... 370/241–252, 370/238; 702/181
See application file for complete search history.

(56) References Cited

U.S. PATENT DOCUMENTS 6,560,584 B1 * 5/2003 Afshar et al. .................... 706/21

OTHER PUBLICATIONS

A Heuristic Technique for Generating Minimal Path and Cutsets of a General Network: Amjet M. Al-Ghanim, Apr. 2000.*

* cited by examiner

*Primary Examiner* — Ricky Ngo
*Assistant Examiner* — Kan Yuen
(74) *Attorney, Agent, or Firm* — Armstrong Teasdalee LLP

(57) ABSTRACT

A computer-based method for determining a probability that no path exists from a specified starting node to a specified target node within a network of nodes and directional links between pairs of nodes is described. The nodes and directional links form paths of a reliability graph and the method is performed using a computer coupled to a database that includes data relating to the nodes and the directional links The method includes selecting a set of paths, from the set of all paths, between the starting node and the target node that have been determined to be reliable, calculating a reliability of the union of the selected path sets, setting an upper bound for the unreliability of the set of all paths, based on the calculated reliability, selecting a set of minimal cutsets from all such cutsets that lie between the starting node and the target node, calculating the probability of the union of the minimal cutsets, and setting a lower bound for the unreliability of the set of all cutsets.

19 Claims, 10 Drawing Sheets unreliability bounds relative difference

RELIABILITY ESTIMATION METHODS FOR LARGE NETWORKED SYSTEMS

CROSS-REFERENCE TO RELATED APPLICATIONS

This application claims the priority of Provisional Patent Application Ser. No. 61/077,047, filed Jun. 30, 2008, which is hereby incorporated by reference in its entirety.

BACKGROUND

The field of the invention relates generally to reliability estimation, and more particularly to reliability estimation methods for large networked systems.

At least a portion of the aircraft industry is transitioning to composite airplanes. The aircraft that incorporate such composite structures have different electrical and conductive characteristics than do traditional aluminum or other metal structures. In particular, a current return network (CRN) is made necessary due to the use of composite structures, the CRN providing lightning protection and a ground electrical plane. However, the CRN needs to be certified and optimized as much as possible. Such a certification typically includes the safety assessment of the CRN which is done by means of reliability estimation for the CRN.

Commonly used prior solutions for estimating the reliability of an airplane system include using a fault tree method and a reliability block diagram method. The fault tree method is inadequate for at least two reasons. First, there is no automated translation of a large aircraft current return network into a fault tree model. The manual translations are prohibitively complex, error-prone, and are not practical to maintain. Second, currently available fault tree solvers are not capable of handling such a large fault tree model, even if one were manually generated.

The reliability block diagram solution is not adequate because of size and computational throughput limitations. In addition, creating a reliability block diagram for an aircraft CRN is as challenging as utilization of the fault tree method.

A Symbolic Hierarchical Automated Reliability and Performance Evaluator (SHARPE) package is a well known reliability and estimation tool in the field of reliability and performability, used by universities as well as by companies. A modeler who is familiar with many different kinds of models, can easily choose models that best suit a particular system and the kind of measure that is needed at each stage of the design. It is also possible to use different kinds of models hierarchically for different physical or abstract levels of the system and to use different kinds of models to validate each other's results. Steady-state and transient computations are available in the tool. The tool provides a modeling paradigm called the Reliability Graph which allows reliability modeling of a network system. However, a reliability graph solver in known versions of the SHARPE tool have not been capable of obtaining an exact solution for the large composite aircraft CRN model, in partdue to the large size of an airplane network CRN.

BRIEF DESCRIPTION

In one aspect, a computer-based method for determining a probability that no path exists from a specified starting node to a specified target node within a network of nodes and directional links between pairs of nodes which form paths of a reliability graph is provided. The method is performed using a computer coupled to a database that includes data relating to the nodes and the directional links. The method includes selecting a set of paths from the set of all paths between the starting node and the target node that have been determined to be reliable paths, calculating a reliability of the union of the selected path sets, setting an upper bound for the unreliability of the set of all paths, based on the calculated reliability, selecting a set of minimal cutsets from all such cutsets that lie between the starting node and the target node, calculating the probability of the union of the minimal cutsets, and setting a lower bound for the unreliability of the set of all cutsets.

In another aspect, a computer for calculating an upper bound and a lower bound to a probability that no path exists between a first node and a second node within a network of nodes via directional links between the first and second node is provided. The computer is coupled to a database containing data relating to the nodes and the directional links. The computer is programmed to determine which paths and cutsets between the first node and the second node are candidates for a first unreliability bounds computation, select from the path and cutset candidates those that contribute the most in narrowing a gap between a current unreliability upper bound and a current unreliability lower bound, and compute an updated unreliability upper bound and an updated unreliability lower bound from the selected paths and cutsets.

In still another aspect, a method for progressively controlling an upper bound and a lower bound of a reliability estimation based on a reliability graph defining paths and cutsets between a starting node and a target node is provided. The method includes utilizing a heuristic algorithm to find the most important paths and cutsets of the reliability graph for utilization in an unreliability bound computation, defining a first upper bound and a first lower bound of a reliability estimation from the found paths and cutsets, selecting the paths and cutsets used in defining the first upper bound and the first lower bound that contribute the most in narrowing a gap between the first upper bound and the first lower bound, and calculating an updated upper bound and an updated lower bound from the selected paths and cutsets.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
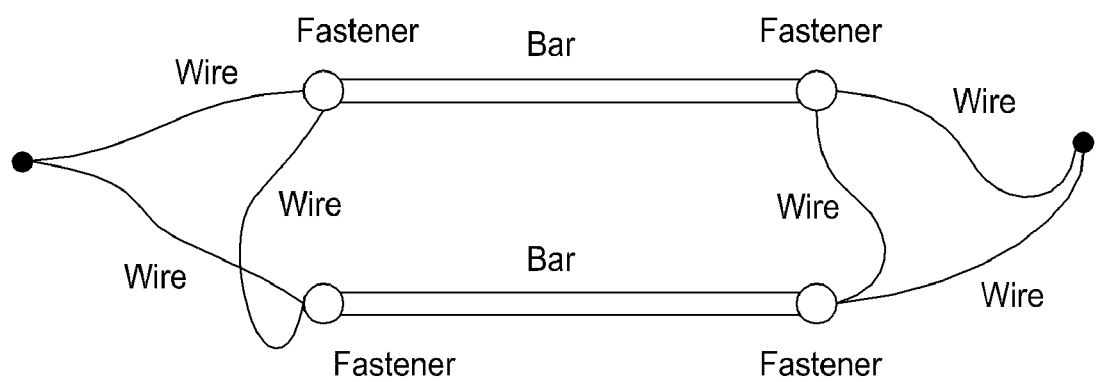
FIG. 1 is an illustration of an exemplary current return network (CRN).

The described embodiments address the problems described above through utilization of an improved reliability graph solver that is used in conjunction with a Symbolic Hierarchical Automated Reliability and Performance Evaluator (SHARPE) software package that incorporates the embodiments described herein. As explained, a prior reliability graph solver and a prior, unimproved SHARPE software tool were not capable of obtaining an exact solution of the large composite aircraft current return network (CRN) reliability graph model. The described embodiments enable obtaining the exact solution for the CRN reliability graph model.

More specifically, the described embodiments relate to a reliability graph modeling and/or analysis method and its implementation as an extension of the SHARPE software application to provide fast and flexible reliability estimation for large networked systems. One or more of the described embodiments avoid the computational intractability of obtaining the exact solution by recursive decomposition or by exhaustive path/cutset enumeration. Instead, at least one of the disclosed embodiments utilizes a bound computation technique to approximate (bound) the exact reliability value based on a heuristic selection of important paths and cutsets. The terms cutset or cutsets refer to a collection of failures of individual parts that causes the system to fail. For example, failure of all parts is a cutset.

As utilized herein, a reliability graph refers to a directed graph comprising nodes and directional links between node pairs. The probability of link unavailability is assigned to each link. The computational problem addressed by the described embodiments is to assess the probability that no path exists from a specified starting node (source node) to a specified terminal node (sink node), which is a measure of the unreliability of the network generated from the reliability graph. With respect to cutsets and a reliability graph, the cutest is a set of links in a reliability graph defined such that if all the links in the set fail, there is no path from the source to the sink. The set of all links is a cutset. A minimal cutset is a cutset having the property that any proper subset of links in the cutset is not a cutset. A path is a set of links that lead from the source to the sink. The path has no loops, that is no node appears more than once among the links in a path. The reliability for the network represented by a reliability graph is the probability that a path exists between the source node and the sink node of the reliability graph. Conversely, the unreliability for the network is defined as the probability than no path exists between the source node and the sink node. Therefore, reliability plus unreliability equals one.

Certain embodiments also include a set of tuning parameters that allow tradeoffs between estimation accuracy and computational resources. With such embodiments, reasonably accurate results can be provided, within a reasonable amount of time, for a large networked system based on the available computing resources.

FIG. 1 shows an exemplary current return network (CRN) 10, according to one embodiment. A CRN refers to an electrical network in the airplane that includes metallic structural components. For example, metallic bars (or rods) 12, wires 14, and fasteners 16 serve to carry lightning pulses safely away from the airplane and also provide an electrical ground for non-essential electrical systems. To operate in such a manner, a CRN can be embodied as an electrical grid composed of bars 12, wires 14, and other conductors (such as fasteners 16) in an area of the aircraft that may connect to metal utilized in the construction of the aircraft.

CRN 10 should be configured to have nearly zero resistance, and there are typically very strict requirements to maintain a low resistivity and voltage drop across such a structure. To verify a configuration of a specific CRN 10, a reliability graph is utilized to produce a model of the CRN 10, where various segments and nodes map to various network elements.

Figure 2:
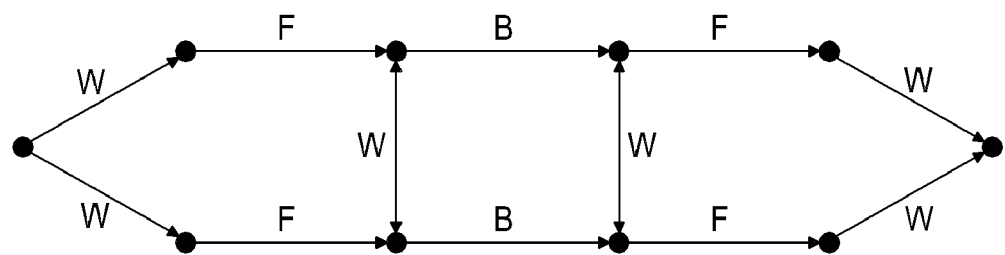
FIG. 2 is an illustration of an exemplary reliability graph.

FIG. 2 shows an exemplary reliability graph 50. A reliability graph is sometimes referred to as a relgraph. Reliability graph 50 corresponds, as is easily discerned to the CRN 10 shown in FIG. 1. A reliability graph is isomorphic, or similar in appearance, to the electrical network being modeled, so it is easier for engineers or other individuals to understand the reliability graph. However, a complex network, such as a current return network for an entire aircraft, can be very difficult to solve. Specifically, for a complex current return network, it is difficult to generate an acceptable reliability graph. The embodiments described below substantially increase the practical size of a network that can be solved. Specific improvements to a reliability graph solver include differences between the various embodiments and prior solutions in contrast with both a fault tree method and a prior reliability graph methodology.

As mentioned above, techniques to quantify service reliability using combinatorial models have been developed. However, when the system becomes complex, the combinatorial modeling approach still faces the largeness problem, and an exact solution for quantifying service reliability cannot be acquired. The embodiments described below relate to reliability bounds computation algorithms for generating reliability graphs.

Many combinatorial models can be converted to reliability graphs, however, in the disclosed reliability graph algorithms, a combinatorial service reliability modeling approach is utilized, where the reliability for each task is described by a distinct combinatorial model. As such, a bounds computation technique can be applied on these combinatorial models to reduce their sizes, which allows the overall upper/lower service reliability bounds to be computed using the upper/lower bound models for each phase.

Network reliability is an important consideration when service providers deploy new network services. To support reliability, many analytical models have been developed for the dependability and performance analysis of the network infrastructure. A reliability graph, such as reliability network graph 50, is one of the commonly used models for network dependability analysis. Problems associated with the generation of the reliability graphs is commonly referred to as one of the reliability graph problem, the s-t connectedness problem, and the network reliability problem.

Referring again to the simplified reliability graph 50 in FIG. 2, the reliability graph consists of a set of nodes and links, where the links represent components that can fail. The graph contains one node, the source s, with no incoming links and one node, the target t, with no outgoing links. A system represented by a reliability graph fails when there is no path from source to target. The links can be assigned failure probabilities, failure rates, unavailability values or failure distributions. A path is a set of links that connects the source to the target through zero or more intermediate nodes. When all links in a path are up, then the system represented by the reliability graph is up. A path is minimal if it has no proper subpaths. A cutset is a set of links such that if all links in the cutset are removed from the graph, there no path exists from the source to the target, for example, if all links in the cutset are down, then the system is down. A cutset is minimal if it has no proper sub-cutsets.

Evaluation of system reliability utilizing a reliability graph model is referred to as terminal pair reliability or as a two terminal reliability problem. The exact solution methods can be categorized into two classes, a factoring/decomposition method and a paths/cutsets enumeration. In the factoring/decomposition method, the basic idea is to choose a link in the reliability graph and break the model into two disjoint cases: In one disjoint case, it is assumed that the link is up and a new graph is generated by merging the two nodes of the link. In the other disjoint case, it is assumed that the link is down and a new graph is generated by removing the link. This factoring/decomposition method is recursively applied on each of the two graphs until the resulting graph becomes a series-parallel structure.

In the paths/cutsets enumeration method a Boolean expression is constructed and evaluated. Based on the Boolean expression evaluation techniques, the expression can be further divided into inclusion/exclusion methods, sum of disjoint products (SDP) methods, and binary decision diagram (BDD) methods. The BDD methods are more recent and in most cases are more efficient for Boolean expression manipulation.

The exact computation of two-terminal reliability is NP-complete. It is time-consuming to get the exact solution when the reliability graph becomes too large, which has led to the development of approximation methods for network reliability computation, which can be classified as reliability computation by means of simulation, and computation of reliability upper and lower bounds. Most of the reliability bounds computation techniques are based on finding certain paths/cutsets or series-parallel subgraphs from which efficient bounds calculation methods can be developed. Some of the computation techniques are based on the reliability polynomials, and some are for graphs with specific structures.

The embodiments disclose a method for calculating upper and lower bounds as a solution to the computation problems associated with large reliability graphs. Computation of the reliability bounds can provide an approximate solution to an otherwise intractable computation problem. For even moderately complex graphs the number of paths and cutsets can be very large, on the order of millions or even billions (see Table 9). Hence enumerating the paths or cutsets and computing exact values for reliability becomes computationally intractable except for the smallest reliability graphs.

One problem associated with previous bounds computation techniques is that they cannot continue improving the reliability upper bound and lower bound when more execution time is given, for example for a specific reliability graph, the outputs of the above bounds computation algorithms are fixed. If the bounds are not tight, they cannot be improved by executing the bounds computation algorithms longer. In the following paragraphs, this problem is addressed by using BDD representations for the reliability upper bound and lower bound calculations, and augmenting the BDDs when more paths and cutsets are discovered.

The advantage of such an approach is that it can not only search the important paths/cutsets that reduce the gap between the reliability upper and lower bounds, but the approach also keeps improving the bounds given a longer execution time. The BDD representation of the bounds makes the path/cutset selection and bounds computation very fast and efficient. Heuristics are first used to search the most important paths/cutsets that can greatly increase/decrease the reliability lower/upper bound, then an exhaustive search is utilized to enumerate all paths/cutsets and compute their contribution to the current reliability lower/upper bound.

One function of the reliability graph is to determine a set of "reliable" paths, which is a subset of all paths, and then calculate the reliability of the union of these paths (R). The reliability of the solution is greater than or equal to R, so (1−R) is an upper bound on the unreliability. Stated in another way, if the reliability is greater than or equal to 0.9, then the unreliability U is less than or equal to 0.1. The higher the estimated R, the lower the upper bound on unreliability. It should be noted that the true unreliability of a network, for example, is less than the lowest of all upper bound estimates on unreliability. Therefore, to achieve a low upper bound, the embodiments disclosed herein focus on selecting the most reliable paths among all paths.

Selection of the most reliable paths is done, for example, by using a well-known graph analysis algorithm called the Djikstra's algorithm, as further described below, for the minimum sum of weights assigned to links in a graph. A single path failure probability can be written as the sum of weights assigned to all links in the path. These weights are the logarithm of the failure probabilities of the links.

More specifically, an unreliability upper bound is computed by counting the number of paths in the reliability graph. First, it is assumed that the status of link i, is represented by the Boolean variable, $e_i$, as links are sometimes referred to as edges, where $$e_i = \begin{cases} 1, & \text{edge } i \text{ is up} \\ 0, & \text{edge } i \text{ is down} \end{cases}$$

and assume $\Pr\{e_i=1\}=r_i$, that is, $r_i$, is the reliability of link i. It is noted that $r_i$ can be easily replaced by $$R_i(t) = e^{-\lambda_i t} \text{ or } R_i(t) = e^{-\int_0^t h_i(x)dx}$$

or by $$A_i = \frac{MTTF_i}{MTTF_i + MTTR_i} \text{ or by } A_i(t) = \frac{\mu_i}{\lambda_i + \mu_i} + \frac{\lambda_i}{\lambda_i + \mu_i}e^{-(\lambda_i+\mu_i)t}.$$

For a path consisting of links $x_1, x_2, \ldots, x_k$, let Boolean expression $$P = e_{x_1} \cdot e_{x_2} \cdot \ldots \cdot e_{x_k}$$

represent the status of that path, for example, $$P = \begin{cases} 1, & \text{the path is up} \\ 0, & \text{the path is down} \end{cases}$$

Therefore, $Pr\{P=1\} = r_{x_1} r_{x_2} \ldots r_{x_k}$. Since the system represented by a reliability graph is up if there exists one or more paths from source to target, the system structure function $\Phi$ can be written as:

$$\Phi = P_1 + P_2 + \ldots + P_n$$

where n is the total number of paths. The system unreliability is $$UR = 1 - Pr\{\Phi = 1\} = 1 - Pr\{P_1 + P_2 + \ldots + P_n = 1\}.$$

Let $\Phi_i = P_1 + P_2 + \ldots + P_i$, and $U_i = 1 - Pr\{\Phi_i = 1\} = Pr\{\overline{P}_1 \cdot \overline{P}_2 \cdot \ldots \cdot \overline{P}_n = 1\}$, then $U_1 \geq U_2 \geq \ldots \geq U_n = UR$ To compute the system unreliability, the Binary Decision Diagram (BDD) is often used as an efficient method for Boolean function manipulation. However for large reliability models, BDD for the system structure function $\Phi$ is too large to build and evaluate, therefore $U_i$ is utilized as the upper bound of UR, and it is attempted to pick the paths that make $U_i$ as close to UR as possible.

The unreliability lower bound is obtained by using the cutsets within the reliability graph. More specifically, a set of minimal cutsets which will be a subset of all minimal cutsets is determined and utilized to calculate the probability of the union of the minimal cutsets (U). Because there can be minimal cutsets of the reliability graph that are excluded from the union, the unreliability of the graph is at least as small as U. It should be noted that the true unreliability is less than the larger of all lower bound estimates on unreliability.

To achieve a high lower bound, the described embodiments focus on selecting the minimal cutsets that have the largest probabilities among all minimal cutsets. Selection of the largest probability minimal cutsets is accomplished, in one embodiment, by using a graph analysis algorithm called the Ford-Fulkerson algorithm as further described below. The algorithm determines the max-flow/min-cut based on weights assigned to the links in a reliability graph. In one embodiment, these weights are the logarithm of the failure probabilities of the links.

The same notation $e_i$ is utilized as above to represent the status of link i. Therefore, for a cutset with links $x_1, x_2, \ldots, x_k$, let $C = \overline{e}_{x_1} \cdot \overline{e}_{x_2} \cdot \ldots \cdot \overline{e}_{x_k}$, then $$C = \begin{cases} 1, & \text{all edges in the cutset are down} \\ 0, & \text{all edges in the cutset are not down} \end{cases}$$

C=1 implies the system is down. Therefore the system structure function is $$\Phi = \overline{C_1 + C_2 + \ldots + C_m}$$

where m is the total number of cutsets. The system unreliability is $$UR = 1 - Pr\{\Phi = 1\} = Pr\{C_1 + C_2 + \ldots + C_m = 1\}.$$

Similar to unreliability upper bound computation, let $\Psi_i = C_1 + C_2 + \ldots + C_i$ and $L_i = Pr\{\Psi_i = 1\} = Pr\{C_1 + C_2 + \ldots + C_i = 1\}$.

Then $L_1 \leq L_2 \leq \ldots \leq L_m \leq UR$.

If the reliability graph is too large to evaluate the system structure function $\Phi$, $L_i$ can be used as the lower bound of system unreliability. As before, algorithms are needed to pick good cutsets in order to make $L_i$ as close to UR as possible.

For large reliability graphs, the time and the storage needed to find all paths and cutsets can be prohibitively large. Even for the paths and cutsets that have been found, it is often impossible to build the BDD for all of them because the BDD size increases with the number of paths/cutsets added. To narrow the gap between unreliability upper bound and lower bound as much as possible with limited time and storage space, the reliability bounds computation is divided into two steps, a path/cutset search, which is to find in the reliability graph new path/cutset candidates for unreliability bounds computation, and a path/cutset selection, which is to select from the path/cutset candidates found in the first step that contribute the most in narrowing the gap between the current upper and lower bounds. The unreliability upper and lower bounds are then computed from the selected paths and cutsets.

In the first step, and in one embodiment, heuristics are used to find the most important path/cutset candidates. When no more such candidates can be found, exhaustive search algorithms are utilized to try to enumerate all path/cutset candidates. The reason both heuristic and exhaustive algorithms for path and cutset search are utilized is that exhaustive methods cannot guarantee to find important paths and cutsets before the time or storage limit is reached. Heuristics can only generate a small number of paths and cutsets without enumerating all of them in the reliability graph, hence accuracy of the computed bounds cannot be guaranteed.

While searching path/cutset candidates, the heuristics are first applied, and exhaustive search algorithms are utilized when no more paths/cutsets can be found by heuristics.

The purpose of heuristic path search is to find the important paths that greatly reduce the upper bound of system unreliability. From above, $U_i = Pr\{\overline{P}_1 \cdot \overline{P}_2 \cdot \ldots \cdot \overline{P}_i = 1\} \geq Pr\{\overline{P}_1 \cdot \overline{P}_2 \cdot \ldots \cdot \overline{P}_{i-1} = 1\} \cdot Pr\{\overline{P}_i = 1\}$. The equality holds only when $P_i$ is independent with $P_1 + P_2 + \ldots + P_{i-1}$, for example, when path i has no shared links with the first i−1 paths. To reduce $U_i$ as much as possible, it is desired to find an independent (such that the equality holds) and reliable (such that $Pr\{P_i = 1\}$ is small) path. Independence can be guaranteed by deleting all links in the path from the graph after it is found. To find the most reliable path, assume $r_i$ to be the reliability of link i, and $x_1, x_2, \ldots, x_k$ to be the links in P, then $$Pr\{P=1\} = r_{x_1} \cdot r_{x_2} \cdot \ldots \cdot r_{x_k}.$$

By putting minus logarithm on both sides of the equation, $-\log(Pr\{P=1\}) = (-\log r_{x_1}) + (-\log r_{x_2}) + \ldots + (-\log r_{x_k})$.

Since $0 \leq r_i \leq 1$ for each link i, $-\log r_i \geq 0$. If a weight $(-\log r_i)$ is assigned to each link i in the reliability graph, then the problem of finding the most reliable path is converted to finding the path with minimum sum of non-negative weights. The latter is known as the shortest path problem and can be solved by several efficient algorithms, for example, Dijkstra's algorithm. The Dijkstra's algorithm works by keeping for each vertex v the cost c[v] of the shortest path found so far. Initially, this value is 0 for the source vertex s and infinity for all other vertices. When the algorithm finishes, c[v] will be the cost of the shortest path from s to v or infinity, if no such path exists. The basic operation of Dijkstra's algorithm is link relaxation: if there is a link from u to v, then the shortest known path from s to u can be extended to a path from s to v by adding link (u, v) at the end. This path will have length c[u]+w(u, v), where w(u, v) is the weight assigned to link (u, v). If this is less than c[v], the current value of c[v] can be replaced with the new value. Pseudo-code for the Dijkstra algorithm is shown in Table 1.

TABLE 1

```
void Dijkstra(G, w, s) {
    // Initialization
    for each vertex v in G{
        c[v] = infinity;
        previous[v] = undefined;
    }
    c[s] = 0;
    S = empty set;
    Q = set of all vertices;
    while Q is not an empty set{
        u = Extract-Min(Q);
        S = S union {u};
        for each edge (u,v) outgoing from u {
            if c[v] > c[u] + w[u][v] {
                c[v] = c[u] + w[u][v];
                previous[v] = u;
            }
        }
    }
}
```

In the Dijkstra algorithm, the input parameter G stores the graph information, w is a 2-dimensional array where w[u][v] is the weight of link (u,v), s is the source node. Function Extract-Min(Q) extracts the vertex u with minimum c[u] in set Q. After the function returns, the shortest path can be found starting from previous [t], where t is the target node.

When the most reliable path P has been found in the current graph, P is deleted from the graph by changing the weights of all links in P to infinity, for example, for link i∈P, let $r_i$=0, thus $-\log(r_i)=\infty$. Dijkstra's algorithm is then applied again on the remaining graph to find the next most reliable path. This procedure is repeated until there is no path with finite sum of weights from source to target. The paths found using the heuristics have no shared links with each other, thus ensuring path independence. If k paths are found, assuming $P_1$, $P_2, \ldots, P_k$, then the unreliability upper bound computed using these k paths is the probability that all k paths fail:

$$UB = Pr\{\overline{P}_1 \cdot \overline{P}_2 \cdot \ldots \cdot \overline{P}_k = 1\} = Pr\{P_1=0\} \cdot Pr\{P_2=0\} \cdot \ldots \cdot Pr\{P_k=0\}.$$

The heuristic path search algorithm can only find a small portion of paths. To further reduce the unreliability upper bound, the exhaustive path search is switched to after no more paths can be found by the heuristics. Breadth First Search (BFS) is used for this purpose. BFS is utilized because it finds shorter paths first which are likely to be more reliable than longer paths. In addition, when same number of paths are found, the number of distinct links covered by BFS is often more than the number covered by Depth First Search (DFS). Therefore the paths truncated (not covered by BFS when it is stopped) usually share more links with the paths already found, thus making the truncated paths less important in reducing the unreliability upper bound.

The BFS is a tree search algorithm for traversing a graph. The basic idea is to first put the source into a FIFO queue, and then expand the first node in the queue by putting all nodes reachable from that node at the end of the queue. After the first node is expanded, it is removed from the queue and the expansion is repeated for the next node in queue. A path is found if the target is reachable from a node being expanded. The algorithm stops when the queue is empty. The pseudo-code of BFS is shown in Table 2. The input parameter s is the source and t is the target.

TABLE 2

```
Node BFS (s, t) {
    EnQueue(queue, s);
    while NotEmpty(queue) {
        node = DeQueue(queue);
        if (node.index == t.index) {
            return node;
        }
        for each child in Expand(node) {
            if NotInPath(child) { //if not a loop
                child.parent = node;
                EnQueue (queue, child);
            }
        }
    }
}
```

For large reliability graphs, sometimes it is not possible to build the BDD for all paths that have been previously found by the algorithms as described above. In such cases, a subset of the paths are selected to construct the BDD for an unreliability upper bound. As an example, if B is the current BDD corresponding to the union of the paths that have already been selected, and $u=1-Pr\{B=1\}$ is the unreliability upper bound evaluated from B. Then for a new path P, let $\hat{B}$ be the BDD for B+P, and let $\hat{u}=1-Pr\{\hat{B}=1\}$ be the new unreliability upper bound evaluated from $\hat{B}$. The path P can be selected if the following condition holds: $\Delta u = \hat{u} \geq \alpha \cdot u$, for example, if by adding path P, the relative reduction on the current unreliability upper bound is greater than α which is a constant between 0 and 1, then P is added into the set of selected paths for upper bound computation. u and B are updated to $\hat{u}$ and $\hat{B}$, respectively. Otherwise, path P is put into a heap sorted by the $\Delta u$ value of P. The reason for storing instead of discarding the unqualified path P is because it may later become qualified as the value of unreliability upper bound becomes smaller.

When using the algorithm, it has been observed that most of the newly found paths do not qualify, which is represented by the inequality in the equation above. For these unqualified paths, while it is time consuming to construct $\hat{B}$ (especially when B becomes large), it is no longer needed after $\hat{u}$ is calculated. To reduce the time cost, it is desirable to avoid the construction of $\hat{B}$ when evaluating $\hat{u}$. Since $\hat{u}=1-Pr\{\hat{B}=1\}=1-Pr\{B+P=1\}=u-Pr\{\overline{B} \cdot P=1\}$, we have $\Delta u = u - \hat{u} = Pr\{\overline{B} \cdot P=1\} = Pr\{P=1\} - Pr\{B \cdot P=1\}$.

$Pr\{B \cdot P=1\}$ can be written as $Pr\{B \cdot P=1\} = Pr\{B|_{P=1}=1\} \cdot Pr\{P=1\}$. Therefore, from the above equations, $\Delta u = Pr\{P=1\} \cdot [1 - Pr\{B|_{P=1}=1\}]$.

Assume $P=e_{x1} \cdot e_{x2} \cdot \ldots \cdot e_{xk}$, then $Pr\{P=1\}=r_{x1}r_{x2}\ldots r_{xk}$, and $Pr\{B|_{P=1}=1\}$ is the probability for B=1 given the constraint $e_{x1}=e_{x2}=\ldots=e_{xk}=1$. This probability can be evaluated from the pseudo-code in Table 3.

TABLE 3

```
double EvalDU(B, P){
    if(B is constant 1)
        return 1;
    if(B is constant 0)
        return 0;
    if(B has been visited)
        return B.value;
```

TABLE 3-continued

```
b = top variable of B;  //denotes an edge in the relgraph
B.value = EvalDU(bdd__then(B), P);
if(P does not contain Boolean variable b){
    v__left = EvalDU(bdd__else(B), P);
    //b.r is the edge's reliability
    B.value = B.value*b.r + v__left*(1−b.r);
}
return B.value;
}
```

In function EvalDU(B,P) of Table 3, P is a product of some Boolean variables representing the links in the path, B is the BDD whose probability needs to be evaluated under constraint P. The function traverses down B to compute $\Pr\{B|_{P=1}=1\}$. Assume b is the top variable of B. If the link denoted by b is not in the path denoted by P, the function computes $\Pr\{B|_{P=1}=1\}$ as follows: B.value=b.r*EvalDU(bdd_then(B), P)+(1−b.r)*EvalDU(bdd_else(B), P) where b.r is the link's reliability, bdd_then(B) and bdd_else(B) return the sub-BDDs pointed by b's 1-link and 0-link, respectively.

If the link denoted by b is in the path denoted by P, the function goes down b's 1-link with probability 1 and ignores the sub-BDD pointed by b's 0-link. $\Pr\{B|_{P=1}=1\}$ is computed as B.value=EvalDU(bdd_then(B), P). Using the method above to compute $\Delta u$, the construction of $\hat{B}$ is avoided, and only part of B needs to be visited.

Table 4 shows the pseudo-code for computing the unreliability upper bound.

TABLE 4

```
double UpperBound(G)
    B = constant 0; u = 1;
    while(true){
        if (paths__found < paths__required){
            P = FindNewPath(G);
            paths__found = paths__found+1;
        }
        else{
            P = ExtractMax(heap);
            if(P.du < alpha*u){
                if (runtime < runtime__required)
                    alpha = alpha / 2;
                else
                    break;  //no more qualified paths
            }
        }
        P.du = Pr{P=1}*(1−EvalDU(B, P));
        if(P.du > alpha*u){
            B = bdd__or(B, P);
            u = u − P.du;
        }
        else
            Insert(heap, P);
    }
    return u;
}
```

In function UpperBound(G), G contains the reliability graph information, while the function FindNewPath(G) returns the next new path, ExtractMax(heap) removes the path with maximum $\Delta u$ from the heap and returns it, Insert (heap, P) adds path P into heap, bdd_or(B,P) computes the BDD for B+P. paths_required is the total number of paths that need to be generated by the path search algorithms, runtime_required is the maximum number of seconds the UpperBound function will run. If all paths that satisfy the inequality $\Delta u = u − \hat{u} \geq \alpha \cdot u$ have been selected and the function has not yet reached the maximum execution time, $\alpha$ is reduced by half and all of the newly qualified paths from the heap are reselected.

Similar to the heuristic path search described above, the purpose of the heuristic cutset search algorithm is to find cutsets that can greatly increase the unreliability lower bound. For example, given two cutsets $C_1$ and $C_2$, $\Pr\{C_1+C_2=1\}=\Pr\{C_1=1\}+\Pr\{C_2=1\}−\Pr\{C_1 \cdot C_2=1\}$. $\Pr\{C_i=1\}$ (i=1, 2) is the product of unreliabilities of links in cutset i, while $\Pr\{C_1 \cdot C_2=1\}$ is the product of unreliabilities of links in the union of the two cutsets. In most cases, the unreliability for each link is quite small, as a result $\Pr\{C_1 \cdot C_2=1\}$ is orders of magnitude smaller than $\Pr\{C_i=1\}$ (i=1, 2) such that it can be neglected in the above equation. As a result, therefore $\Pr\{C_1+C_2=1\}$ can be approximated using $\Pr\{C_1=1\}+\Pr\{C_2=1\}$.

The unreliability lower bound $L_i$ can be written as $L_i=\Pr\{C_1+C_2+\ldots+C_i=1\} \approx \Pr\{C_1=1\}+\Pr\{C_2=1\}+\ldots+\Pr\{C_i=1\}$. This approximation can be applied as long as $\Pr\{C_x \cdot C_y=1\} << \min(\Pr\{C_x=1\}, \Pr\{C_y=1\})$ ($1 \leq x$, $y \leq i$), and this condition holds if each link's unreliability is small. From the above equation, it is desired to find the most unreliable cutsets to increase the lower bound as much as possible.

For a cutset $C=e_{x1} \cdot e_{x2} \ldots e_{xk}$, $\Pr\{C=1\}=(1−r_{x1})(1−r_{x2})\ldots(1−r_{xk})$, therefore $−\log[\Pr\{C=1\}]=[−\log(1−r_{x1})]+[−\log(1−r_{x2})]+\ldots+[−\log(1−r_{xk})]$. To find the cutset C with maximum $\Pr\{C=1\}$ is the same as to find C with minimum $−\log[\Pr\{C=1\}]$. If we assign capacity $−\log(1−r_j) \geq 0$ to each link j, finding the cutset C with maximum unreliability is to find C with minimum sum of capacities. The latter problem is known as maxflow/mincut problem, and can be solved utilizing Ford-Fulkerson's algorithm.

The Ford-Fulkerson's algorithm works by finding a flow augmenting path in the graph. By adding the flow augmenting path to the flow already established in the graph, the maximum flow will be reached when no more flow augmenting paths can be found in the graph. An augmenting path is a path from source to target such that for any node u and its successor v in this path, either 1. there is an link (u, v) in the graph that has $\delta(u, v)=c(u, v)−f(u, v)>0$ or there is an link (v, u) in the graph that has $\delta(u, v)=f(v, u)>0$.

The flow augment is the minimum $\delta$ of all the links in the augmenting path. When no path can be augmented from source to target, there exists a set of vertices N, to which augmenting paths still exist from the source. A cutset with minimum sum of capacity is the set of links that connect from vertices in N to vertices in V−N, where V is the total vertices set.

To guarantee convergence, Breadth First Search (BFS) is used to find augmenting paths. The difference between the BFS described previously in Table 2 and this one is that the latter looks for only one shortest path, therefore a node is visited at most once. The Ford-Fulkerson's algorithm runs in $O(VE^2)$ time if BFS is used for augmenting path search, where V is the number of vertices, E is the number of links.

Table 6.5 shows the pseudo-code for Ford-Fulkerson's algorithm.

TABLE 5

```
//let G be the input graph
initialize an array f such that f[e] = 0 for any edge e in G
while there exists a source->target path in the residual graph {
    choose such a path P
    augment(f, P)
    update residual graph
}
augment(array f, path P) {
    c = lowest residual capacity of edges on P
    for each edge e on P {
        if e is a forward edge
            f[e] += c
```

TABLE 5-continued

```
        if e is a backwards edge
            f[e] -= c
        }
}
```

When a cutset C is found, the flow of each link in the graph is reset to 0, then the Ford-Fulkerson's algorithm is applied again to find the next most unreliable cutset. To avoid returning to the same cutset C, the capacity of the most reliable link in C is changed, assuming j, to infinity, for example $r_j$=1, and run the Ford-Fulkerson's algorithm with updated capacities. This procedure stops when there is no cutset with a finite sum of capacity left.

When no more cutset can be found by the described heuristic cutset search, an exhaustive cutset search is utilized to further increase the unreliability lower bound. Some algorithms have been proposed for cutset enumeration of directed or undirected graphs, and the pseudo-code for one simple and efficient algorithm is shown in Table 6.

TABLE 6

```
void CutSetEnum(G, S, n) {
    if (n == t) return;
    G = G*n; S = S + n;
    Recursively absorb isolated nodes of G into S;
    if (SS is found in the hash table)
        return;
    else
        add S to the hash table;
    Output a cutset of S;
    for each node n_i adjacent to S
        CutSetEnum(G, S, n_i);
}
```

In Table 6, S is the source vertices set, initially set to empty. G stores the graph information, and n is the vertex to be merged into S. After n is merged into S, the isolated nodes are absorbed into S, which are the vertices that can only reach the target node by going through one or more nodes in S. For example, if all vertices in S are removed, the isolated vertices cannot reach the target. A cutset is solely determined by S, which is the set of links connecting vertices in S to vertices outside S. If S has been generated and put into the hash table before, the cutset will be ignored, otherwise a new cutset is found, and the current S is stored into the hash table. For each node n_i not in S, but reachable from nodes in S, the CutSetEnum(G, S, n_i) function is recursively called to merge that node into S to generate new cutsets.

Given the cutsets that have been found, we select some of them to build the BDD for unreliability lower bound computation. Let D be the current BDD corresponding to the union of the cutsets that have already been selected, $l=Pr\{D=1\}$. Given a new cutset C, let $\hat{D}$ be the BDD for D+C, $\hat{l}=Pr\{\hat{D}=1\}$. Then $\Delta l=\hat{l}-l$ is the increment of the current unreliability lower bound by adding C. C is selected if $\Delta l \geq \beta \cdot l$, where $\beta$ is a constant between 0 and 1. The selection procedure is similar to that described above with respect to path selection. One difference is that for a cutset C, $\Delta l$ can be approximated by $Pr\{C=1\}$, and $\Delta l \leq Pr\{C=1\}$. Therefore we can use $Pr\{C=1\}$ to first filter out most of the cutsets that do not satisfy the inequality $\Delta l \geq \beta \cdot l$. For example, if $Pr\{C=1\} < \beta \cdot l$, it is certain that $\Delta l < \beta \cdot l$. However, if $Pr\{C=1\} \geq \beta \cdot l$, the following equation is used to compute the exact value of $\Delta l$.

$$\Delta l = Pr\{\hat{D}=1\} - Pr\{D=1\} = Pr\{\overline{D} \cdot C = 1\}$$
$$= Pr\{C=1\} - Pr\{D \cdot C = 1\}$$
$$= Pr\{C=1\} \cdot [1 - Pr\{D|_{C=1}=1\}]$$

Given $C=e_{x1} \cdot e_{x2} \cdot \ldots \cdot e_{xk}$, $Pr\{D|_{C=1}=1\}$ is the probability for D=1 with constraint $e_{x1}=e_{x2}= \ldots =e_{xk}=0$. A technique similar to the one in Table 3 can be applied to evaluate the following probability: when traversing down D, sub-BDDs connected by the 1-links of $e_{x1}, e_{x2}, \ldots, e_{xk}$ will be ignored. The pseudo-code for the evaluation is shown in Table 7. Table 8 shows the pseudo-code for the unreliability lower bound computation. The procedure is similar to unreliability upper bound computation shown in Table 4, so a detailed description for this function is not provided.

TABLE 7

```
double EvalDL(D, C){
    if(D is constant 1)
        return 1;
    if(D is constant 0)
        return 0;
    if(D has been visited)
        return D.value;
    b = top variable of D;    //denotes an edge in the relgraph
    D.value = EvalDL(bdd_else(D), C);
    if(C does not contain Boolean variable b){
        v_right = EvalDU(bdd_then(D), C);
        //b.r is the edge's reliability
        D.value = D.value*(1–b.r) + v_right*b.r;
    }
    return D.value;
}
```

TABLE 8

```
double LowerBound(G)
    D = constant 0;    l = 0;
    while(true){
        if (cuts_found < cuts_required){
            C = FindNewCut(G);
            cuts_found = cuts_found+1;
        }
        else{
            C = ExtractMax(heap);
            if(C.dl < beta*l){
                if (runtime < runtime_required)
                    beta = beta / 2;
                else
                    break;    //no more qualified cutsets
            }
        }
        if (Pr{C=1} >= beta*l){
            C.dl = Pr{C=1}*(1–EvalDL(D, C));
            if(C.dl > beta*l){
                D = bdd_or(D, C);    l = l + C.dl;
                continue;
            }
        }
        Insert(heap, C);
    }
    return l;
}
```

Figure 3:
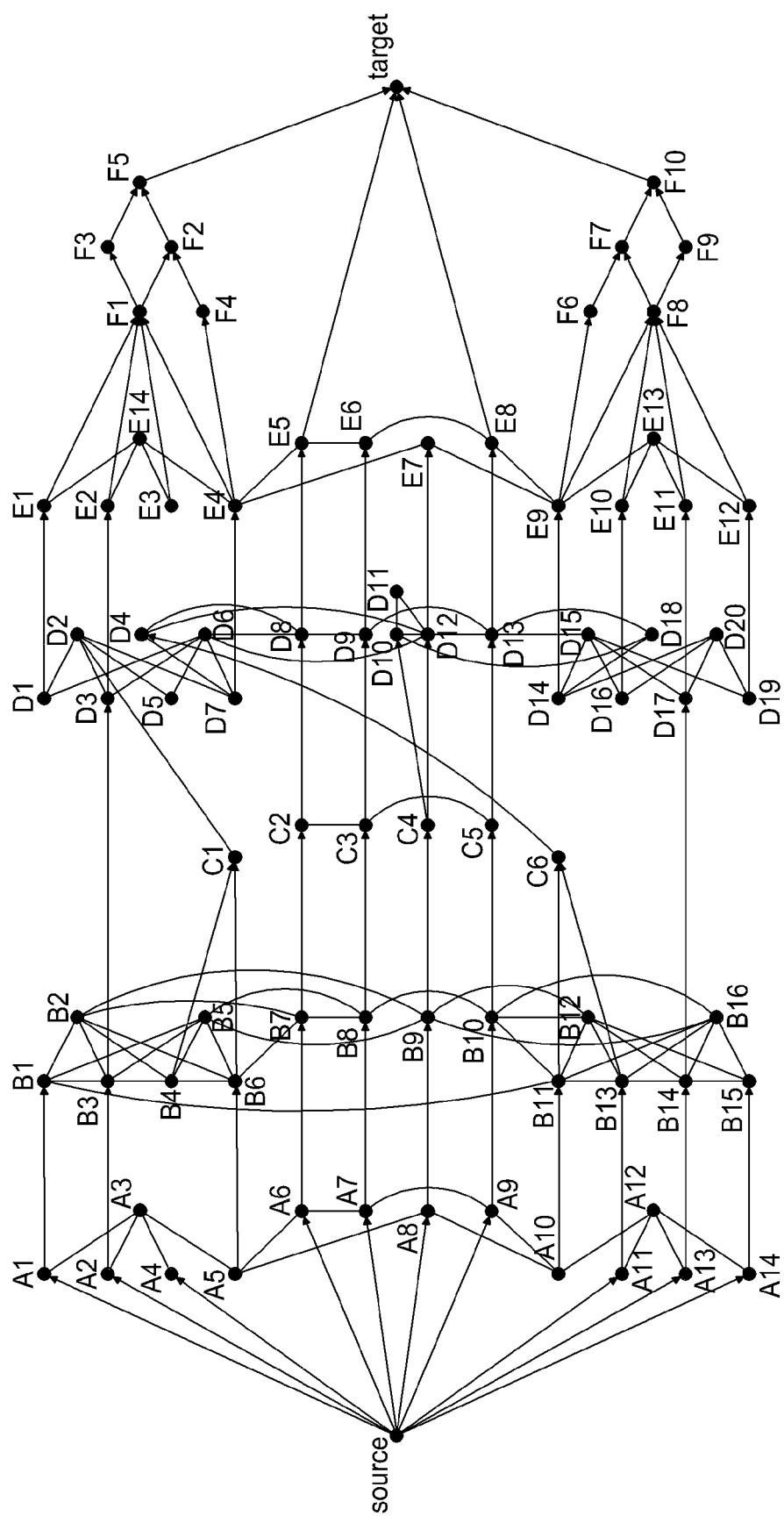
FIG. 3 is an illustration of another reliability graph.

To provide example numerical results, the unreliability upper/lower bounds computation approach is applied on an example reliability graph. The graph 100 is shown in FIG. 3. Graph 100 contains six sections A, B, C, D, E, and F besides the source 102 and the target 104. There are 82 nodes and 171 links, each link may fail with constant failure rate, and the system represented by the reliability graph is up if there are one or more paths from the source to the target. Table 9 shows the number of paths from various nodes to the target. As seen from the table, there are approximately $4 \times 10^{12}$ paths from the source to the target; it is not possible to list all of them, not to mention constructing the BDD to calculate the exact system reliability.

TABLE 9

| node | #paths |
|---|---|
| $E_7 \rightarrow$ target | 40 |
| $D_{12} \rightarrow$ target | 143140 |
| $C_4 \rightarrow$ target | 308055 |
| $B_9 \rightarrow$ target | 21054950355 |
| $A_8 \rightarrow$ target | 461604232201 |
| source $\rightarrow$ target | $4248274506778 \approx 4 \times 10^{12}$ |

The unreliability bounds computation approach has been applied to the example reliability graph of FIG. 3. In this experiment, the failure rate of each link is $\lambda = 10^{-7}$ hour$^{-1}$, the default system exposure time is $t = 10^5$ hours (so the reliability of each link is $r = e^{-\lambda t} = e^{-10^{-7} \cdot 10^5} \approx 0.99$). For the parameters of the bounds computation algorithms, the maximum number of paths/cutsets to find (paths_required in Table 4 and cuts_required in Table 8) is 10000, the default execution time (runtime_required in Table 4 and in Table 8) for the bounds computation algorithms is 120 seconds.

Figure 4:
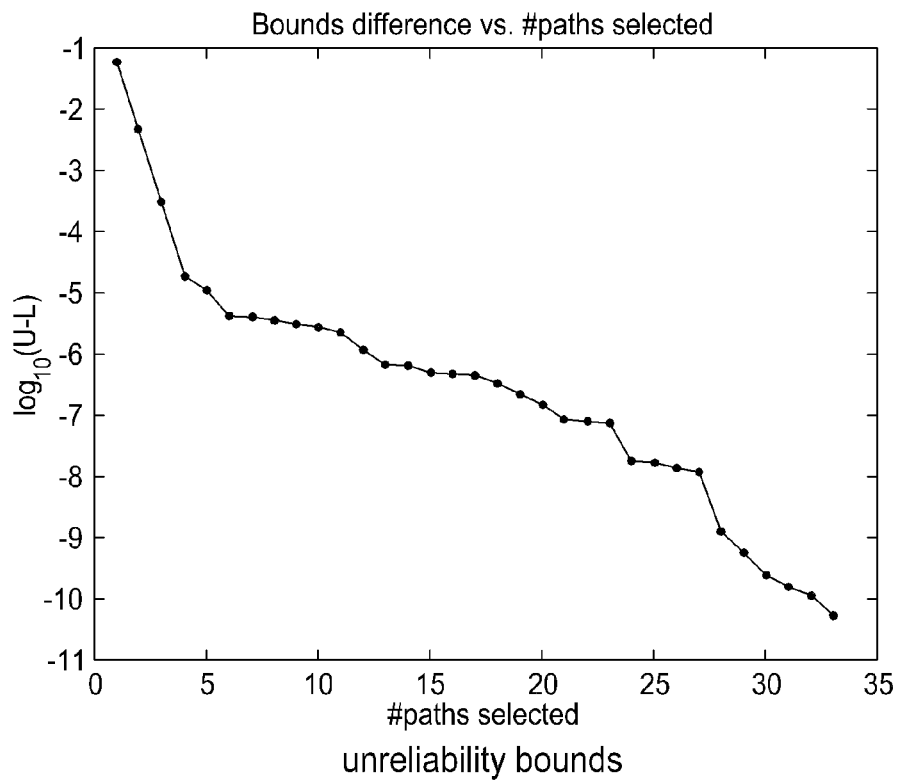
FIG. 4 is a graph illustrating the difference of unreliability upper and lower bounds versus the number of selected paths/cutsets selected.
Figure 5:
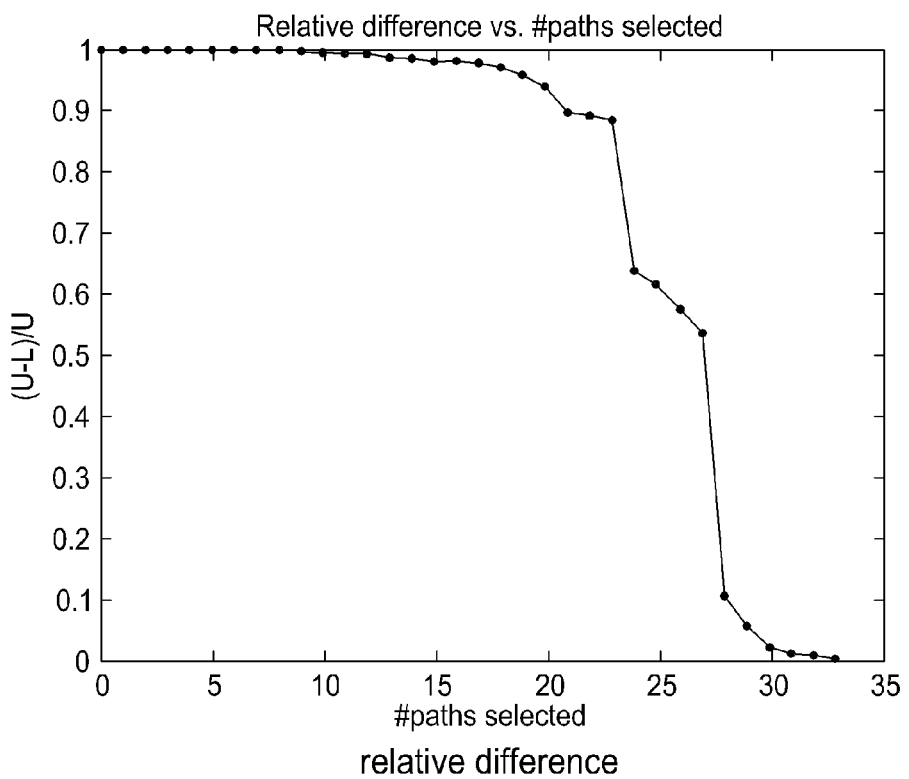
FIG. 5 is a graph illustrating a relative difference versus the number of selected paths/cutsets selected for the bounds of FIG. 4.

FIGS. 4 and 5 show the difference of unreliability upper and lower bounds versus the number of selected paths/cutsets. In these figures, the execution time for both upper and lower bound computation algorithm is 900 seconds. There are 33 paths selected for unreliability upper bound, and 113 cutsets selected for lower bound. The reason why more cutsets than paths are selected is that the time to find a qualified cutset C is much smaller than the time to find a qualified path P, because $\Delta l$ in $\Delta l \geq \beta \cdot 1$ can be first approximated by $\Pr\{C=1\}$ before its exact value is computed. Therefore more cutsets will be scanned and selected when the execution time is the same for both upper and lower bound computation.

In FIG. 4, the x-axis is i, the number of paths selected, and the y-axis is $\log_{10}(U_i - L_j)$, where $j = i \square 113/33$. The number of points in the curve is 33 which is the number of upper bound values. The factor 113/33 is to select 33 out of the 113 lower bound values to correspond to the 33 upper bound values, and we wish these 33 lower bound values to be evenly distributed. The absolute value of y-axis is the number of zeros in the difference between unreliability upper and lower bound. As seen from the figure, the gap between upper and lower bounds decreases as more paths and cutsets are selected.

FIG. 5 shows the relative difference between the upper bound and lower bound. Again the x-axis is the number of paths selected, the y-axis is $(U_i - L_j)/U_i$ where i is the number of selected paths, $j = i \square 113/33$ is the number of selected cutsets. As the number of selected paths/cutsets increases, the relative difference decreases. When 33 paths and 113 cutsets are selected (i=33), the relative difference is around 0.005, for example, the upper bound is 0.005 larger than the lower bound, which means both bounds are close to the exact system unreliability.

TABLE 10

| | runtime | | |
|---|---|---|---|
| | 20 seconds | 120 seconds | 900 seconds |
| upper bound | 1.1460365721e-008 | 1.0814324701e-008 | 1.0255197263e-008 |
| lower bound | 1.0199959877e-008 | 1.0199959877e-008 | 1.0199959877e-008 |

Table 10 shows the unreliability upper/lower bounds versus different execution times for the bounds computation. The first row is the maximum number of seconds the algorithm can run for either upper or lower bound, the second row is the computed unreliability upper bound, and the third row is the computed unreliability lower bound. As shown in Table 10, the bounds become closer when more execution time is given.

Figure 6:
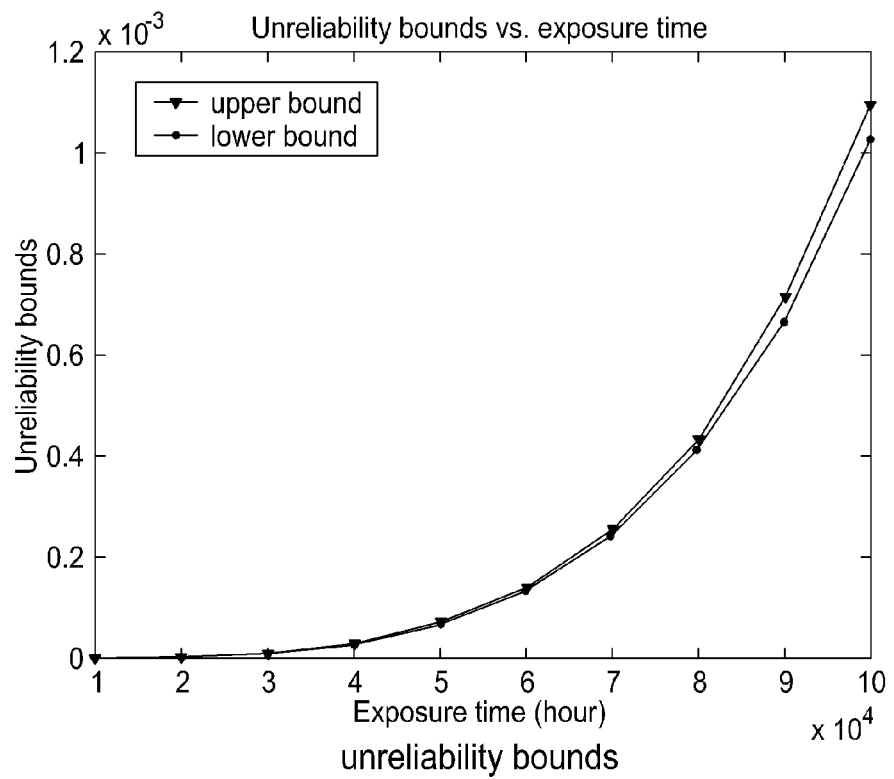
FIG. 6 is a graph illustrating the change of unreliability upper/lower bounds with the system exposure time.
Figure 7:
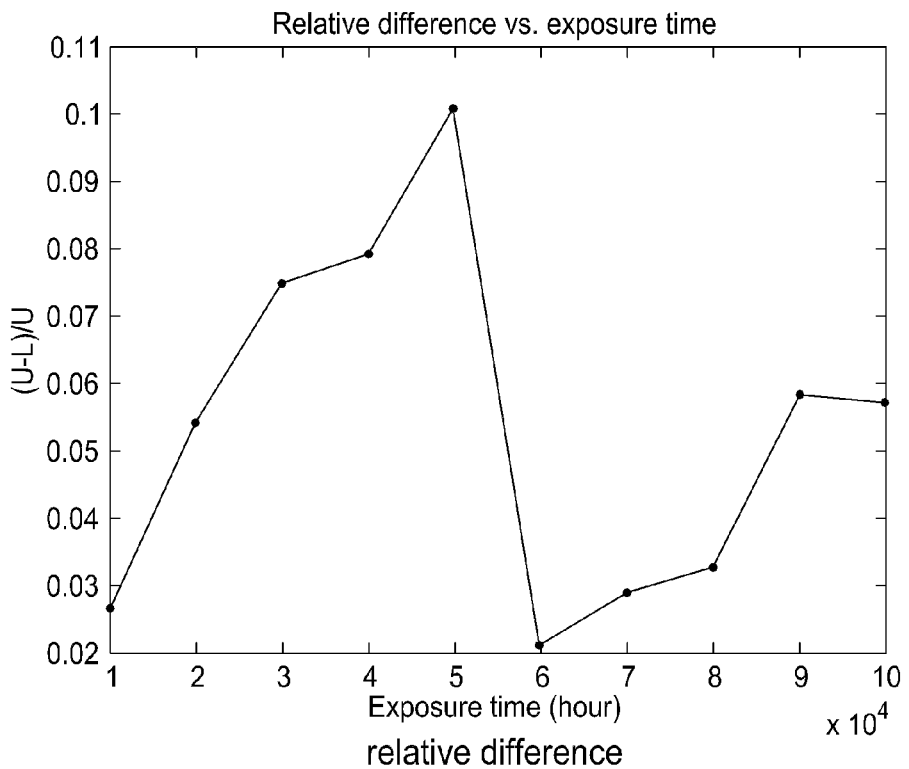
FIG. 7 is a graph illustrating the relative difference for the system exposure time of FIG. 6.

FIGS. 6 and 7 illustrate the change of unreliability upper/lower bounds with the system exposure time. In these figures both upper and lower bound computation algorithms run for 120 seconds for each exposure time. The x-axis is the system exposure time varied from 10000 hours to 100000 hours, in FIG. 6 the y-axis is the unreliability bound and there are two curves corresponding to upper bound U and lower bound L, respectively.

In FIG. 7 the y-axis is the relative difference of the two bounds (U−L)/U. As seen from the figure, both unreliability bounds increase with the exposure time because the link reliability decreases with the exposure time; and the relative difference between the two bounds for each exposure time is in [0.02, 0.1], a rather small interval.

The algorithms utilized in the described embodiments can be controlled by either the absolute or the relative precision in the unreliability estimate, upper bound on the paths and cutsets to be explored, the computing time to be spent or a combination of the above based on whichever criteria is met first. Regardless of the control method, the true unreliability is guaranteed to be within the lower and upper bound. The described embodiments also are helpful as they provide a preliminary design analysis, though at a lower precision and at faster run times. As a network design reaches maturity, the precision and run time can be progressively increased. Depending on the application the embodiments allow for refining either the upper or lower bound as needed at the expense of increased computation time.

When modeling the service reliability using state space models, a state explosion problem is often encountered. To avoid this problem, the described embodiments propose the modeling of service reliability modeling using combinatorial models. However for complex computer systems and networks, such as aircraft current return networks, even the combinatorial models cannot completely avoid the largeness problem and the exact solution for service reliability cannot be acquired. Approximation methods are proposed herein to deal with the largeness problem of reliability graph which is one type of combinatorial model.

Other combinatorial model types can also be represented by reliability graphs, therefore the developed techniques described herein are not limited to reliability graphs, but can also be applied to other combinatorial models which are able to be converted into reliability graphs. The described techniques can also be directly applied to a service reliability modeling approach, to deal with the largeness problem of the combinatorial models for each phase of the PMS (Phased Mission System). As a result, the BDD size of the overall PMS will also be reduced.

The unreliability approximation of the reliability graph is made by computing the unreliability upper bound and lower bound for reliability graphs. The unreliability upper bound is computed by selecting some paths and discarding all the others in the reliability graph. Similarly the unreliability lower bound is computed by selecting some cutsets in the reliability graph. If the reliability is too large to enumerate all paths and cutsets, the paths/cutsets that cannot be enumerated are automatically discarded.

The size of the BDD for unreliability upper bound increases with the number of paths selected. To avoid generating too large a BDD, a heuristic path search is developed to find several most important paths that can greatly decrease the unreliability upper bound. Subsequently, exhaustive path search algorithm is applied to find more paths to further reduce the unreliability upper bound. An efficient and simple method is implemented to compute a path's contribution on the current upper bound reduction, thus the time cost for path selection procedure is reduced. Similarly for unreliability lower bound computation, heuristic algorithms as well as exhaustive search algorithms for cutsets, and an efficient cutset selection procedure have been developed.

One bounds computation algorithm has been applied to a large real example reliability graph which contains about 4 trillion paths. It is not possible to enumerate all paths/cutsets in such a large reliability graph, not to mention computing the exact reliability. However, through utilization of the described bounds computation algorithms developed herein, the unreliability upper bound is just 0.005 larger than the unreliability lower bound, given 15 minutes execution time for each bound computation procedure.

How the upper/lower bounds change with the number of paths/cutsets selected has been studied, as well as the execution time for bounds computation algorithms, and the system exposure time. For each of the exposure times utilized, the unreliability upper bound and lower bound are quite close to each other.

Figure 9:
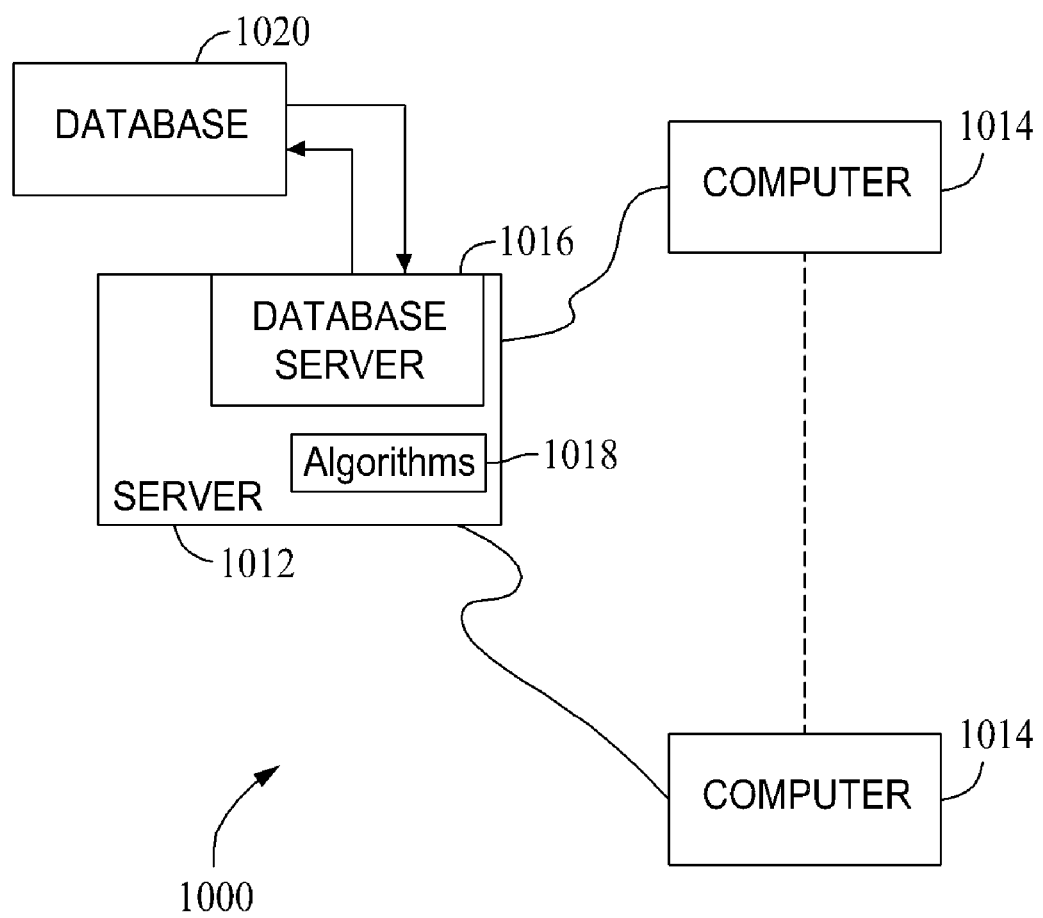
FIG. 9 is a simplified block diagram of an exemplary embodiment of a server architecture of a system, in accordance with one embodiment of the present invention.

Those skilled in the art will understand that the above described embodiments are to be implemented utilizing one or more computer systems. To that end, FIG. 9 is a simplified block diagram of an exemplary system 1000. More specifically, in the example embodiment, system 1000 includes a server system 1012, and a plurality of client sub-systems, also referred to as client systems 1014, connected to server system 1012. In one embodiment, client systems 1014 are computers including a web browser, such that server system 1012 is accessible to client systems 1014 using the Internet. Client systems 1014 are interconnected to the Internet through many interfaces including a network, such as a local area network (LAN) or a wide area network (WAN), dial-in-connections, cable modems and special high-speed ISDN lines. Client systems 1014 could be any device capable of interconnecting to the Internet including a web-based phone, personal digital assistant (PDA), or other web-based connectable equipment. A database server 1016 is connected to a database 1020 containing, for example, information on a variety of networks, such as the current return networks described herein. In one embodiment, centralized database 1020 is stored on server system 1012 and can be accessed by potential users at one of client systems 1014 by logging onto server system 1012 through one of client systems 1014. In an alternative embodiment, database 1020 is stored remotely from server system 1012 and may be non-centralized. Server system 1012 also includes the algorithms 1018 for generating reliability graphs, for example, and the modified SHARPE programs mentioned else in this disclosure.

Figure 10:
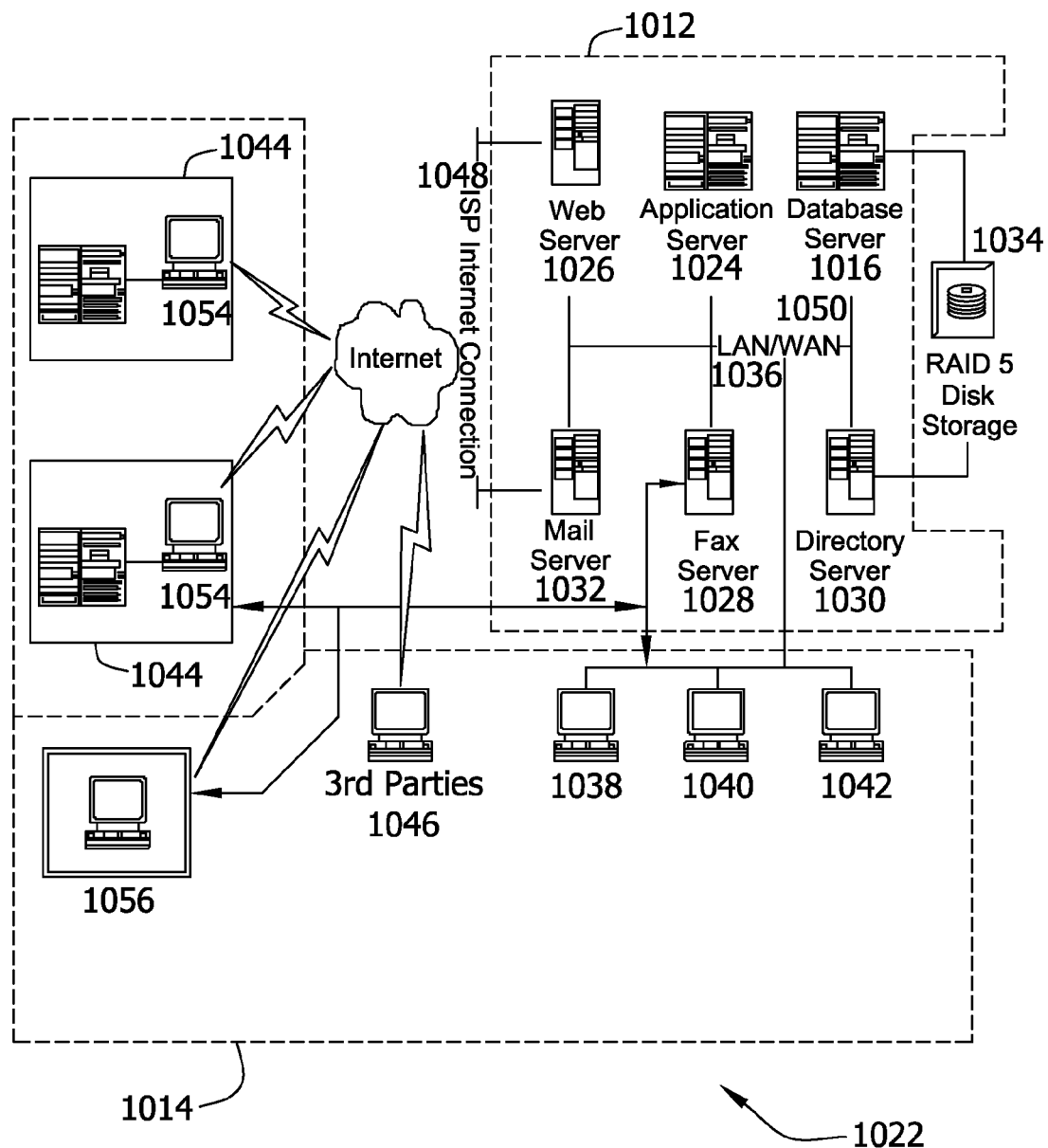
FIG. 10 is an expanded block diagram of an exemplary embodiment of a server architecture of a system, in accordance with one embodiment of the present invention.

FIG. 10 is an expanded block diagram of an exemplary embodiment of server architecture of a system 1022, in accordance with one embodiment. Components in system 1022, identical to components of system 1000 (shown in FIG. 9), are identified in FIG. 10 using the same reference numerals as used in FIG. 9. System 1022 includes server system 1012 and client systems 1014. Server system 1012 may further include a database server 1016, an application server 1024, a web server 1026, a fax server 1028, a directory server 1030, and a mail server 1032. A disk storage unit 1034 is coupled to database server 1016 and directory server 1030. Servers 1016, 1024, 1026, 1028, 1030, and 1032 are coupled in a local area network (LAN) 1036. In addition, a system administrator's workstation 1038, a user workstation 1040, and a supervisor's workstation 1042 are coupled to LAN 1036. Alternatively, workstations 1038, 1040, and 1042 are coupled to LAN 1036 using an Internet link or are connected through an Intranet.

Each workstation, 1038, 1040, and 1042 is a personal computer having a web browser. Although the functions performed at the workstations typically are illustrated as being performed at respective workstations 1038, 1040, and 1042, such functions can be performed at one of many personal computers coupled to LAN 1036. Workstations 1038, 1040, and 1042 are illustrated as being associated with separate functions only to facilitate an understanding of the different types of functions that can be performed by individuals having access to LAN 1036.

Server system 1012 is configured to be communicatively coupled to various individuals, including employees 144 and to third parties, e.g., suppliers, customers, etc., 1046 using an ISP Internet connection 1048. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 1050, local area network 1036 could be used in place of WAN 1050.

In the exemplary embodiment, any authorized individual having a workstation 1054 can access system 1022. At least one of the client systems includes a manager workstation 1056 located at a remote location. Workstations 1054 and 1056 are personal computers having a web browser. Also, workstations 1054 and 1056 are configured to communicate with server system 1012. Furthermore, fax server 1028 communicates with remotely located client systems, including a client system 1056 using a telephone link. Fax server 1028 is configured to communicate with other client systems 1038, 1040, and 1042 as well.

In regard to the above described computer systems, and regarding differences with above mentioned the fault tree method, in the case of an electrical network such as an aircraft current return network, the improved reliability graph model described herein is advantageous as it provides a concise representation of the physical structure that can be easily recognized by mechanics, technicians, and engineers. If an equivalent fault tree for a commercial aircraft current return network is built, it is practically impossible to validate and verify the correctness of the model. In addition, current fault tree solvers are not capable of solving such a large fault tree model.

Regarding differences with the standard reliability graph method, at least one described embodiment improves significantly on currently available reliability graph solution methods. The current method cannot solve the model of a large networked system like the aircraft current return network in any reasonable amount of time. It is well known from existing research that such reliability computation is NP-complete (Non-Polynomial) in the complexity of the computation time. That means the computational time increases exponentially with the size of the model so that an exact analytical solution is computationally intractable for large systems in general. The disclosed embodiments include an innovative truncational/selection reliability graph solution method that bounds the true value of the reliability within a small interval. As a result, the general problem of obtaining a reliability evaluation of large networked system in a reasonable time is elegantly resolved. The disclosed approach can be used for even larger networked system's reliability evaluation in the future.

Figure 11:
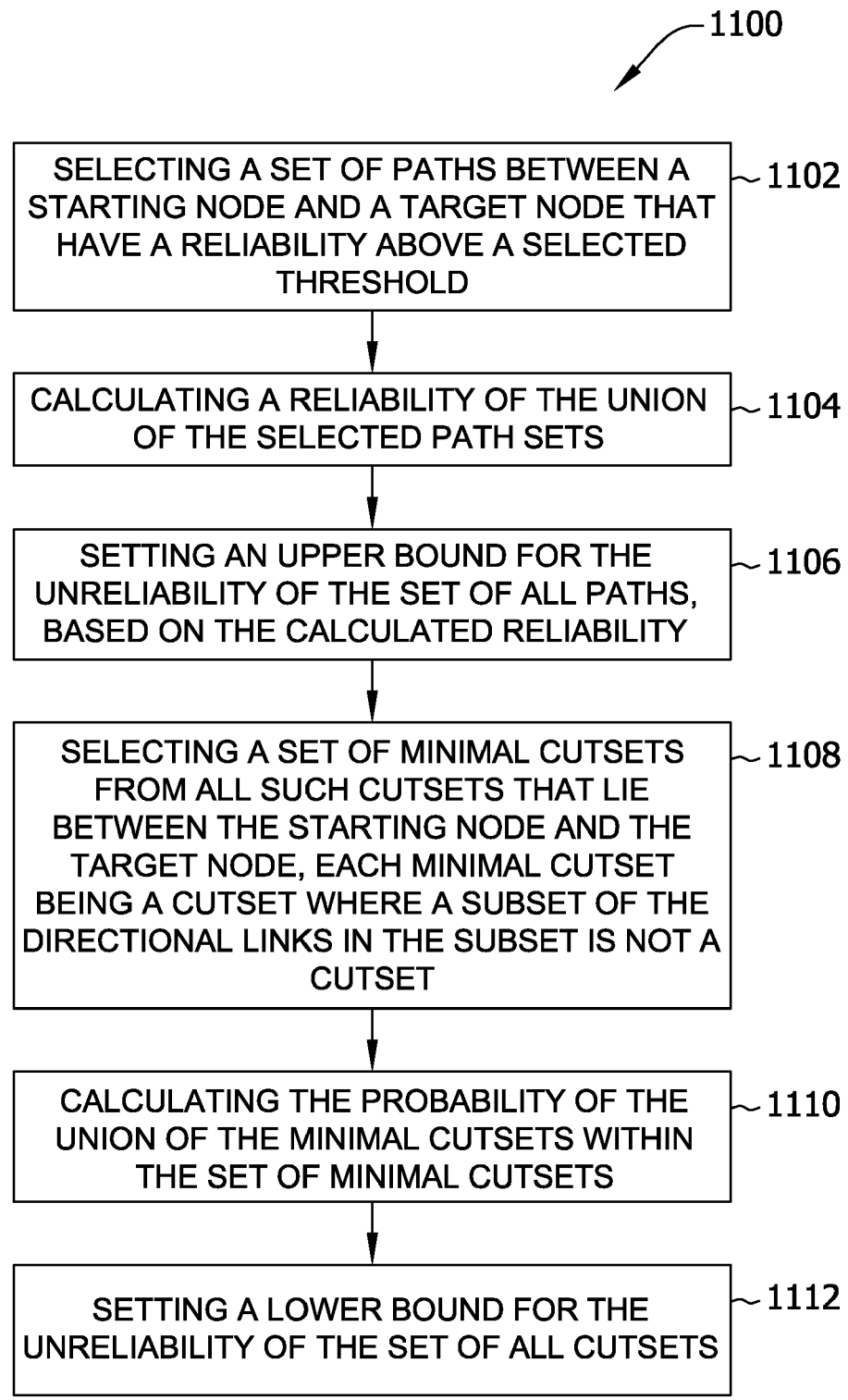
FIG. 11 is a flowchart illustrating a method for determining a probability that no path exists from a specified starting node to a specified target node within a network of nodes and directional links between pairs of nodes which form paths of a reliability graph.

To further illustrate the above described embodiments, FIG. 11 is a flowchart 1100 illustrating a method for determining a probability that no path exists from a specified starting node to a specified target node within a network of nodes and directional links between pairs of nodes which form paths of a reliability graph (such as reliability graph shown in FIG. 3. In an embodiment, the method is performed using a computer coupled to a database, such as shown and described with respect to FIGS. 9 and 10 that includes data relating to the nodes and the directional links. The method includes selecting 1102 a set of paths, from the set of all paths, between the starting node and the target node that have been determined to have a reliability above a selected threshold, calculating 1104 a reliability of the union of the selected path sets, and setting 1106 an upper bound for the unreliability of the set of all paths, based on the calculated reliability. The method further includes selecting 1108 a set of minimal cutsets from all such cutsets that lie between the starting node and the target node, each minimal cutset within the set of minimal cutsets being a cutset where a subset of the directional links in the subset is not a cutset, calculating 1110 the probability of the union of the minimal cutsets within the set of minimal cutsets, and setting 1112 a lower bound for the unreliability of the set of all cutsets.

Figure 12:
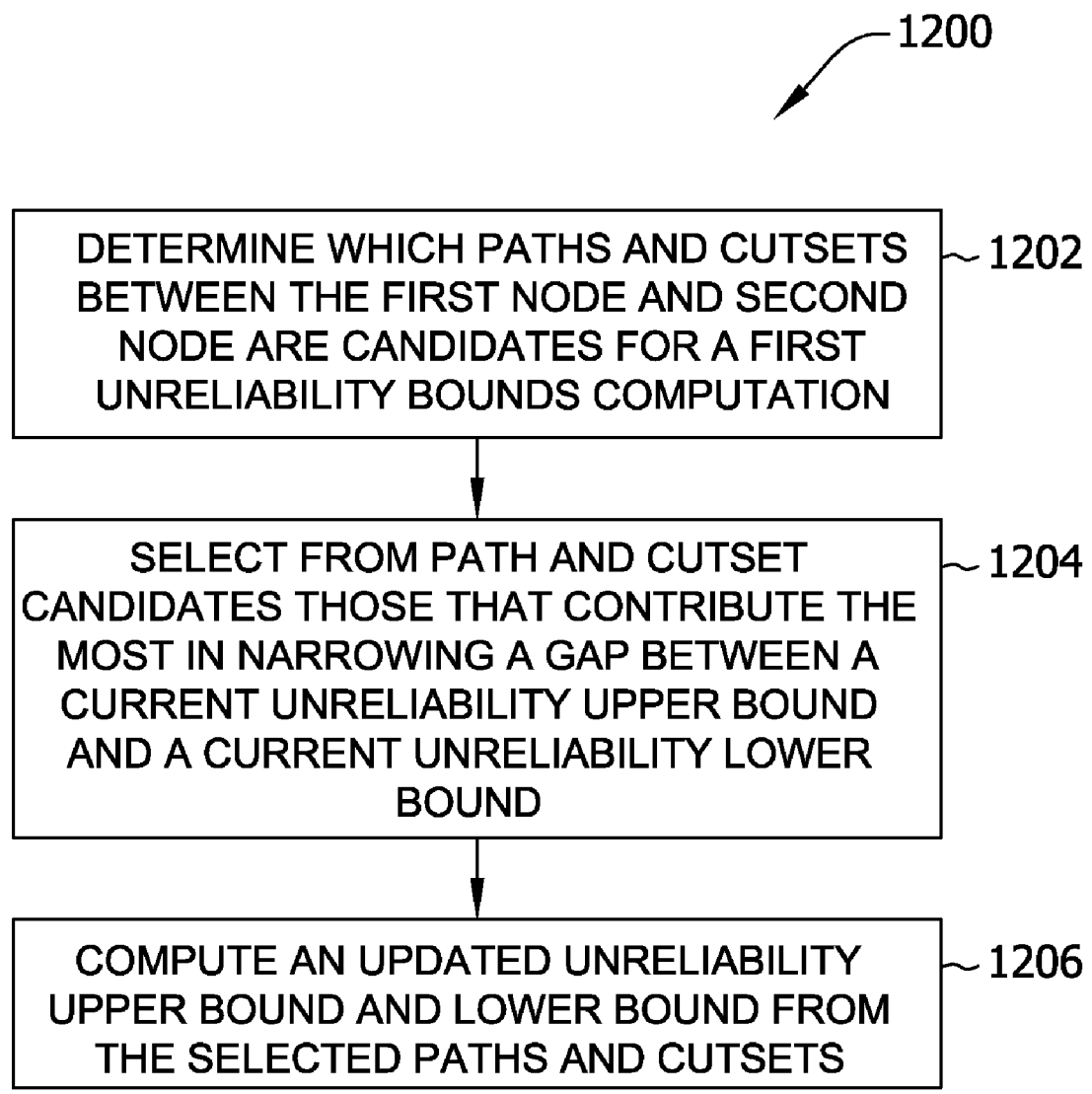
FIG. 12 is a flowchart illustrating calculation of an upper bound and a lower bound to a probability that no path exists between a first node and a second node within a network of nodes and directional links between the first and second node.

FIG. 12 is a flowchart 1200 illustrating calculation of an upper bound and a lower bound to a probability that no path exists between a first node and a second node within a network of nodes and directional links between the first and second node. When using a computer, such as shown in FIGS. 9 and 10, to perform the calculations, the computer includes a processing device communicatively coupled to a database containing data relating to the nodes and the links. Such computer is programmed to determine 1202 which paths and cutsets between the first node and the second node are candidates for a first unreliability bounds computation, select 1204 from the path and cutset candidates those paths and cutsets that contribute the most in narrowing a gap between a current unreliability upper bound and a current unreliability lower bound, and compute 1206 an updated unreliability upper bound and an updated unreliability lower bound from the selected paths and cutsets.

Figure 13:
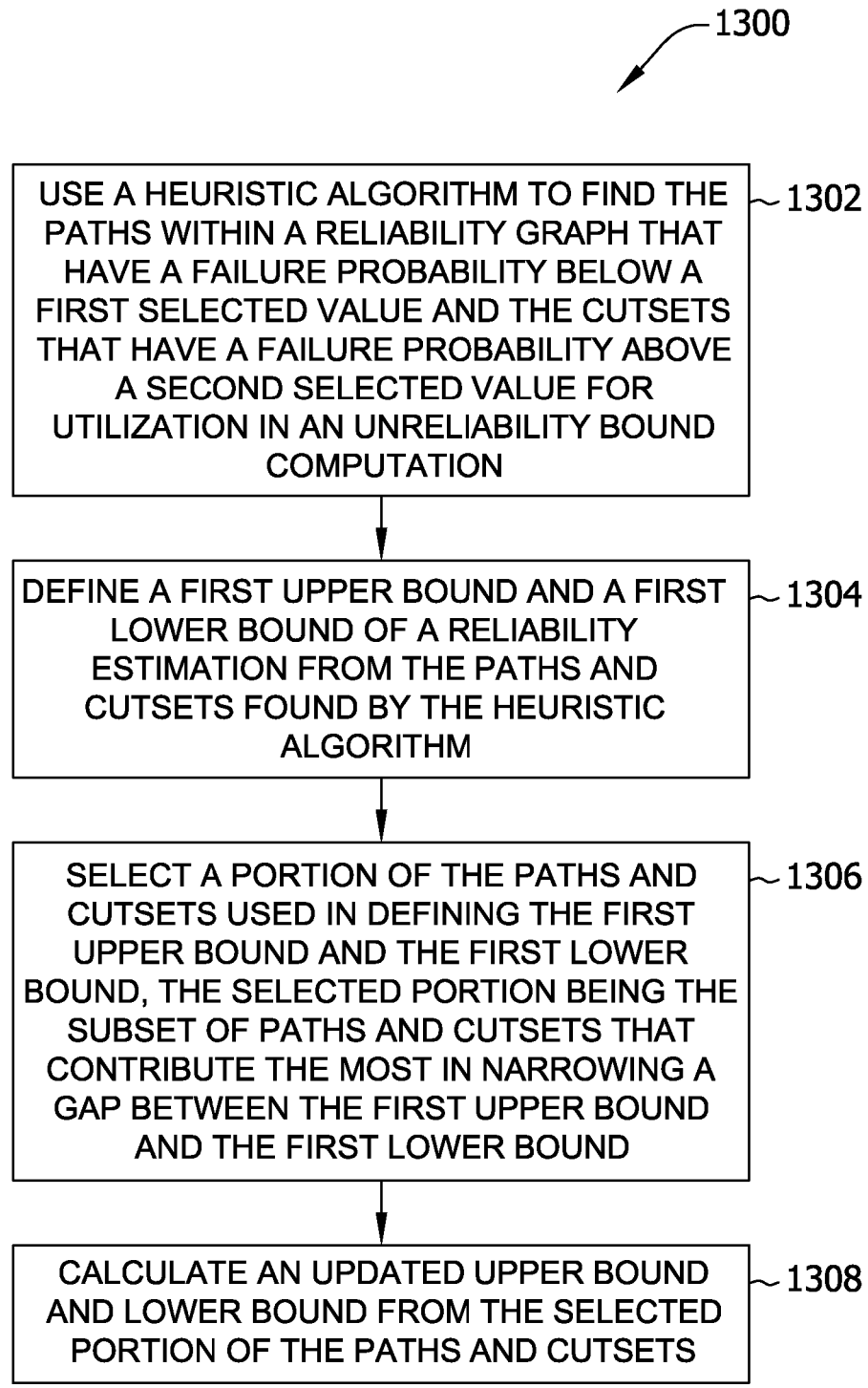
FIG. 13 is a flowchart illustrating a method for progressively controlling an upper bound and a lower bound of a reliability estimation based on a reliability graph defining paths and cutsets between a starting node and a target node.

FIG. 13 is a flowchart illustrating a method 1300 for progressively controlling an upper bound and a lower bound of a reliability estimation based on a reliability graph defining paths and cutsets between a starting node and a target node. The method includes using 1302 a heuristic algorithm to find the paths within the reliability graph that have a failure probability below a first selected value and find the cutsets of the reliability graph that have a failure probability above a second selected value for utilization in an unreliability bound computation, defining 1304 a first upper bound and a first lower bound of a reliability estimation from the paths and cutsets found by the heuristic algorithm, selecting 1306 a portion of the paths and cutsets used in defining the first upper bound and the first lower bound, the selected portion being the subset of paths and cutsets that contribute the most in narrowing a gap between the first upper bound and the first lower bound, and 1308 calculating an updated upper bound and an updated lower bound from the selected portion of the paths and cutsets.

Presently disclosed embodiments are beneficial because they may provide a reliability estimation of large networked systems that cannot be computed by any of the known existing solutions. In this manner, the various embodiments may provide a flexible reliability bound estimation that can be customized by a set of parameters based on the available computing resources and accuracy requirement. The user can specify the number of paths or cutsets in the approximate reliability graph model, or the program runtime, or the path (cutset) selection using a probability threshold: alpha (beta). The disclosed reliability graph method and its implementation can decide the desired parameter setting and compute the reliability estimation. Embodiments may be used as a part of a Federal Aviation Administration (FAA) current return network reliability certification.

In this manner, currently described embodiments may enable the reliability estimation of large network system such as current return networks in reasonable computation time. Therefore many more design iterations can be evaluated in a faster time plus more complex designs can be evaluated, saving considerable time in design/analysis stage of an aircraft development program, for example. In addition, more optimal design selection leading to better performance of the fielded product may result.

Elements of various embodiments may include: 1) the efficient algorithm of path and cutset selection in a large reliability graph model for reliability bounds estimation, and 2) the implementation of the above algorithm as an extension of the SHARPE software package. A cutset is a mathematical construct of the set of elements that are connected via a distribution network.

Figure 8:
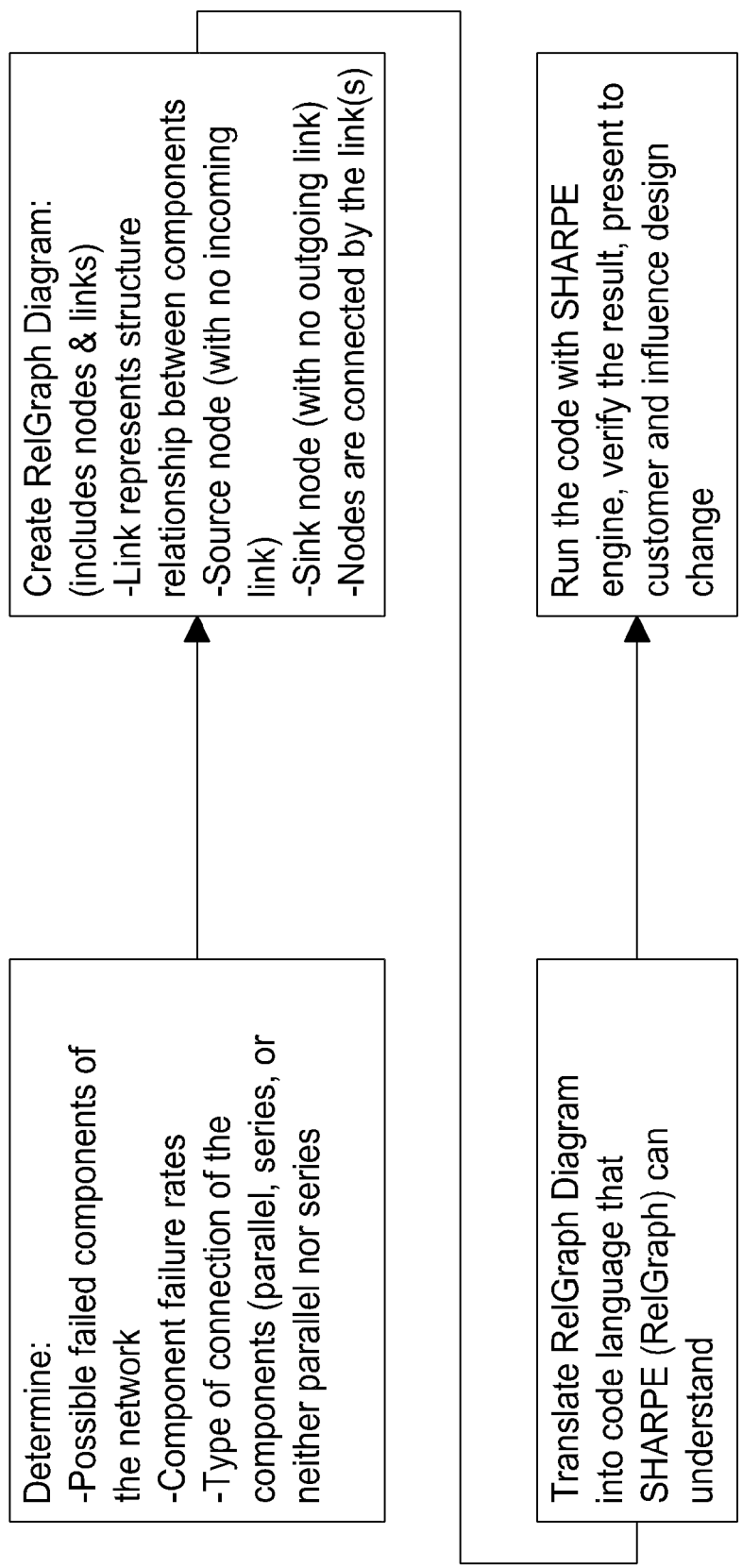
FIG. 8 is a flow diagram illustrating one embodiment of a method for estimating reliability.

FIG. 8 is a flow diagram illustrating one embodiment of a method for estimating reliability and is described in the following sentences. The process of estimating the reliability of a current return network as in FIG. 1 may include determining the elements of the current return network including the fasteners or lugs, the bars, the wires and other elements that make up the current return network. A source and sink node are then picked based on the current flow requirements. The next step is to estimate the probability of failure or the failure rate of the individual element types. The reliability graph is then drawn on a paper or computer that captures the elements and their connectivity from chosen source and sink node. Although they look like a node in the current return network, fastener elements are also modeled as a "link" in the reliability graph since fasteners can fail. Then the reliability graph model is written in the input language of SHARPE and the model is solved to estimate the reliability.

At least one benefit is that an embodiment can be used to solve large reliability graph models by means of not trying to obtain the exact reliability but determining an estimate by bracketing the true value with lower and upper bounds on reliability. The methods to determine the bounds involve Boolean algebra as their foundation and also the use of graph theoretic methods to determine which paths or cutsets need to be picked for computation. The combination of graph theoretic methods and Boolean algebra is key in solving large graphs in reasonable time.

Paths and cutsets are optimally selected based on how much contribution they will make to the total reliability or unreliability. For example longer paths are less reliable than shorter ones as more elements are subject to failure within the longer path. The graph theoretic methods help pick the most contributing paths first and. ignores the other less important paths. The exhaustive method reverts to the original, limited method in the original SHARPE program. The new method uses graph theory in a novel way to truncate the number of paths which must be examined without compromising accuracy.

One or more embodiments include a technique for using graph theoretic constructs together with Boolean analysis methods to more efficiently solve a reliability graph. To demonstrate the methods described herein, the reliability graph module in the SHARPE computer program was modified to utilize those methods, and the modified SHARPE program was used to successfully solve the connectivity of a large electrical network, specifically, a current return network. Generation of such a solution would have been impossible utilizing the original SHARPE methods. The embodiments herein disclose an innovative truncation/selection reliability graph solution method that bounds the true value of the reliability within a small interval, where the general problem of obtaining a reliability evaluation of large networked system in a reasonable time is elegantly resolved.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for determining a probability that no path exists from a specified starting node to a specified target node within a network of nodes and directional links between pairs of nodes which form paths of a reliability graph, said method performed using a computer coupled to a database that includes data relating to the nodes and the directional links, said method comprising:
    selecting a set of paths, from the set of all paths, between the starting node and the target node that have been determined to have a reliability above a selected threshold;
    calculating a reliability of the union of the selected path sets;
    setting an upper bound for the unreliability of the set of all paths, based on the calculated reliability;
    selecting a set of minimal cutsets from all such cutsets that lie between the starting node and the target node, each minimal cutset within the set of minimal cutsets being a cutset where a subset of the directional links in the subset is not a cutset;
    calculating the probability of the union of the minimal cutsets within the set of minimal cutsets; and
    setting a lower bound for the unreliability of the set of all cutsets.

2. A computer-based method according to claim 1 wherein selecting a set of paths between the starting node and the target node comprises:
    calculating the logarithm of a reliability for each directional link within at least one path between the starting node and the target node;
    setting a logarithm of reliability for an individual path as the sum of the logarithm of reliabilities for each directional link in the path;
    transforming the reliability estimation into a graph theoretic framework; and
    selecting a set of paths that have a failure probability below a selected value to be the reliable paths, the set of paths selected utilizing at least one graph theory methodology.

3. A computer-based method according to claim 1 wherein selecting a set of minimal cutsets that lie between the starting node and the target node comprises:
    calculating the logarithm of a failure probability for each directional link within at least one cutset situated between the starting node and the target node;
    setting a logarithm of failure probability for an individual cutset as the sum of the logarithm of failure probabilities for each link in the cutset;
    transforming the reliability estimation into a graph theoretic framework; and
    selecting a set of cutsets that have a large failure probability, the set of cutsets selected utilizing at least one graph theory methodology.

4. A computer-based method according to claim 1 wherein selecting a set of paths between the starting node and the target node further comprises counting the number of paths in the reliability graph.

5. A computer-based method according to claim 1 wherein calculating a reliability of the union of the selected path sets comprises:
    representing the status of each link, i, with the Boolean variable, $e_i$, where $$e_i = \begin{cases} 1, & \text{edge } i \text{ is up} \\ 0, & \text{edge } i \text{ is down}; \end{cases}$$

assuming that $\Pr\{e_i=1\}=r_i$, where $r_i$ is the reliability of link i; and
letting the Boolean expression, $P=e_{x_1} \cdot e_{x_2} \cdot \ldots 19\ e_{x_k}$, represent the status of path, P, for a path consisting of links $x_1, x_2, \ldots, x_k$, where for P=1 the path is up and for P=0 the path is down, resulting in $\Pr\{P=1\}=r_{x_1} r_{x_2} \ldots r_{x_k}$.

6. A computer-based method according to claim 5 wherein setting an upper bound for an unreliability of the selected path sets comprises:
    letting a system structure function be represented by $\Phi=P_1+P_2+\ldots+P_n$, where n is the total number of paths within the reliability graph;
    calculating the system unreliability as $UR=1-\Pr\{\Phi=1\}=1-\Pr\{P_1+P_2+\ldots+P_n=1\}$ and the upper bound as $U_i=1-\Pr\{\Phi_i=1\}=\Pr\{\overline{P}_1 \cdot \overline{P}_2 \cdot \ldots \cdot \overline{P}_n=1\}$ since $\Phi_i=P_1+P_2+\ldots+P_i$, and $U_1 \geq U_2 \geq \ldots \geq U_n=UR$; and
    selecting a plurality of paths that make $U_i$ as close to UR as possible, the paths selected utilizing at least one graph theory methodology.

7. A computer-based method according to claim 1 wherein calculating the probability of the union of the minimal cutsets comprises:
    representing the status of each link, i, with the Boolean variable, $e_i$, where $$e_i = \begin{cases} 1, & \text{edge } i \text{ is up} \\ 0, & \text{edge } i \text{ is down}; \end{cases}$$

assuming that $\Pr\{e_i=1\}=r_i$, where $r_i$ is the reliability of link i;

letting the Boolean expression $C=\bar{e}_{x_1}\cdot\bar{e}_{x_2}\cdot\ldots\cdot\bar{e}_{x_k}$, represent the status of the cutset, C, for a cutset consisting of links $x_1, x_2, \ldots, x_k$, where for C=1 all links in the cutset are down and for C=0 all links in the cutset are not down.

8. A computer-based method according to claim 7 wherein setting a lower bound for an unreliability of the selected cutsets comprises:

letting a system structure function be represented by $$\Phi = \overline{C_1 + C_1 + \ldots + C_m},$$

where m is the total number of cutsets within the reliability graph;

calculating the system unreliability as $UR=1-\Pr\{\Phi=1\}=\Pr\{C_1+C_2+\ldots+C_m=1\}$ and the lower bound as $L_i=\Pr\{\Psi_i=1\}=\Pr\{C_1+C_2+\ldots+C_i=1\}$, since $\Psi_i=C_1+C_2+\ldots+C_i$ and $L_1 \leq L_2 \leq \ldots \leq L_m \leq UR$; and selecting a plurality of cutsets that make $L_i$ as close to UR as possible, the cutsets selected utilizing at least one graph theory method.

9. A computer for calculating an upper bound and a lower bound to a probability that no path exists between a first node and a second node within a network of nodes and directional links between the first and second node, said computer comprising:

a processing device communicatively coupled to a database containing data relating to the nodes and the links, said computer programmed to:

determine which paths and cutsets between the first node and the second node are candidates for a first unreliability bounds computation;

select from the path and cutset candidates those paths and cutsets that contribute the most in narrowing a gap between a current unreliability upper bound and a current unreliability lower bound; and compute an updated unreliability upper bound and an updated unreliability lower bound from the selected paths and cutsets.

10. A computer according to claim 9 wherein to select from the path and cutset candidates, said computer is programmed to find an independent path such that the equality holds in $U_i=\Pr\{\bar{P}_1\cdot\bar{P}_2\cdot\ldots\cdot\bar{P}_i=1\}\geq\Pr\{\bar{P}_1\cdot\bar{P}_2\cdot\ldots\cdot\bar{P}_{i-1}=1\}\cdot\Pr\{\bar{P}_i=1\}$ and $\Pr\{P_i=1\}$ is below a predetermined threshhold.

11. A computer according to claim 9 wherein to determine which paths and cutsets between the first node and the second node are candidates for a first unreliability bounds computation, said computer is programmed to:

calculate the logarithm of a reliability for each directional link within at least one path between the starting node and the target node;

set a logarithm of reliability for an individual path as the sum of the logarithm of reliabilities for each link in the path;

calculate the logarithm of a failure probability for each directional link within at least one cutset situated between the starting node and the target node; and set a logarithm of failure probability for an individual cutset as the sum of the logarithm of failure probabilities for each link in the cutset.

12. A computer according to claim 11 wherein to select from the path and cutset candidates, said computer is programmed to:

select a set of paths that have a failure probability below a first selected value to be reliable paths, the set of paths selected utilizing at least one graph theory method; and select a set of minimal cutsets that have a failure probability above a second selected value, the set of cutsets selected utilizing at least one graph theory method.

13. A method for progressively controlling an upper bound and a lower bound of a reliability estimation based on a reliability graph defining paths and cutsets between a starting node and a target node, said method comprising:

utilizing a heuristic algorithm running on a computing device to find the paths within the reliability graph that have a failure probability below a first selected value and find the cutsets of the reliability graph that have a failure probability above a second selected value for utilization in an unreliability bound computation;

defining, by the computing device, a first upper bound and a first lower bound of a reliability estimation from the paths and cutsets found by the heuristic algorithm;

selecting a portion of the paths and cutsets used in defining the first upper bound and the first lower bound, the selected portion being the subset of paths and cutsets that contribute the most in narrowing a gap between the first upper bound and the first lower bound; and calculating, by the computing device, an updated upper bound and an updated lower bound from the selected portion of the paths and cutsets.

14. A method according to claim 13 wherein selecting a portion of the paths and cutsets that contribute the most to narrowing a gap comprises:

selecting a subset of the found paths, the selected subset having a reliability that is greater than the non-selected paths, the selection performed using a graph analysis algorithm;

selecting a subset of the found cutsets, using a graph analysis algorithm, the selected subset of cutsets being those that have the largest probabilities for increasing the lower bound; and repeating the selecting steps until a time limit or a computational limit is reached.

15. A method according to claim 14 wherein selecting the most reliable of the found paths using a graph analysis algorithm comprises defining a single path failure probability as the sum of weights assigned to the links that make up the path, where the weights are the logarithm of the failure probabilities of the links.

16. A method according to claim 14 wherein selecting the most reliable of the found paths using a graph analysis algorithm further comprises:

deleting the most reliable path from the graph by changing the weight of the links in that path to infinity;

applying the graph analysis algorithm to the remaining paths to find the next most reliable path; and repeating the deleting and applying steps until there is no path from the source to the target that has a finite sum of weights.

17. A method according to claim 14 wherein selecting, using a graph analysis algorithm, the found cutsets that have the largest probabilities for increasing the lower bound comprises determining a maximum flow and minimum cut based on weights assigned to the links of the reliability graph, where the weights are the logarithm of the failure probabilities of the links.

18. A method according to claim 14 wherein selecting, using a graph analysis algorithm, the found cutsets that have the largest probabilities for increasing the lower bound comprises:

deleting the most unreliable cutset from the graph by setting a flow associated with each link in the cutset to zero;

applying the graph analysis algorithm to the remaining cutsets to find the next most unreliable cutset; and repeating the deleting and applying steps until there is no cutset with a finite sum of flow capacity.

19. A method according to claim 13 further comprising utilizing an exhaustive search algorithm to search the paths and cutsets when no more paths and cutsets that narrow the gap between upper and lower bounds can be identified with the heuristic algorithm.

* * * * *